United States Patent [19]

Clenet

[11] 4,036,521
[45] July 19, 1977

[54] TRUCK COVER ASSEMBLY

[76] Inventor: Alain Jean-Marie Clenet, 369 Paseo de Playa No. 111, Ventura, Calif. 93001

[21] Appl. No.: 535,365

[22] Filed: Dec. 23, 1974

[51] Int. Cl.² .............................................. B60P 7/02
[52] U.S. Cl. ................................ 296/100; 296/137 D
[58] Field of Search .............. 296/100, 98, 10, 137 A, 296/39 R, 39 A, 101, 137 B, 137 C, 137 D; 135/1 A, 4 A, DIG. 4, DIG. 5; 9/1.5; 160/DIG. 18, 242, 243, 238, 24, 25

[56] References Cited

U.S. PATENT DOCUMENTS

| | | | |
|---|---|---|---|
| 193,573 | 7/1877 | Tripp | 160/24 |
| 320,245 | 6/1885 | Hamm | 160/238 |
| 486,459 | 11/1892 | Gerhard | 296/98 |
| 1,786,048 | 12/1930 | Williams | 296/98 |
| 2,465,621 | 3/1949 | Wheeler | 296/100 |
| 2,751,977 | 6/1956 | Pinkerton | 160/238 |
| 2,943,760 | 7/1960 | Hamilton | 296/100 |
| 3,069,199 | 12/1962 | Reardon | 296/100 X |
| 3,146,824 | 9/1964 | Veilleux | 296/98 |
| 3,151,908 | 10/1964 | Horst | 296/137 B |
| 3,175,857 | 3/1965 | Lewis | 135/4 A X |
| 3,201,171 | 8/1965 | Wickard | 296/100 |
| 3,367,347 | 2/1968 | Smith | 135/1 A |
| 3,433,526 | 3/1969 | Field et al. | 296/137 A |
| 3,511,408 | 5/1970 | Hughes | 296/100 X |
| 3,819,227 | 6/1974 | Carli | 296/137 D |

FOREIGN PATENT DOCUMENTS

L17,420  9/1955  Germany ............................ 296/100

Primary Examiner—Albert J. Makay
Assistant Examiner—Winston H. Douglas
Attorney, Agent, or Firm—Lindenberg, Freilich

[57] ABSTRACT

A cover assembly for covering the open bed of a pickup truck, which can be easily installed and which can be compactly and safely stored on the truck when not in use. The assembly includes a pair of flexible sheet cover sections with inner edges that can be zipped together and outer edges held to elongated levers which are hinged on mounts at the sides of the truck, so that when the levers are pivoted down the flexible cover sections are pulled taut. The outer edge of each cover section is wrapped about a long mount rod, and the rod and cover portion wrapped thereabout are held in a recess of the lever to substantially eliminate localized stress concentrations in the tightened cover section. The mount devices for mounting each lever on a truck side includes a block of rubber which fits closely through a stake hole in the truck, a bolt extending through the rubber block, and a nut which can be tightened to squeeze the block so that it expands sidewardly to become trapped in place.

4 Claims, 9 Drawing Figures

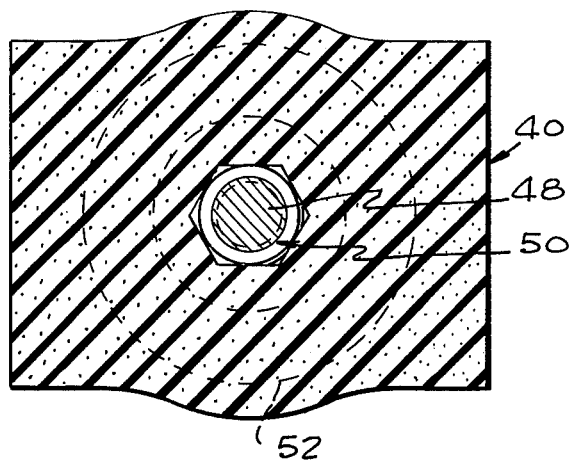
Fig. 2
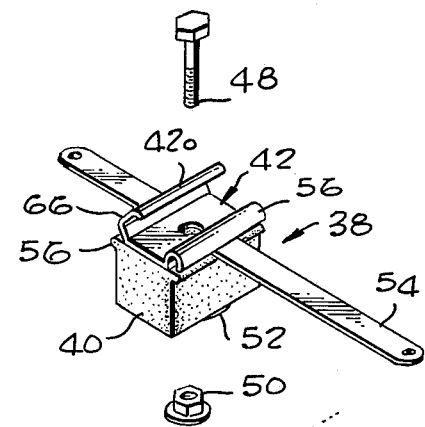
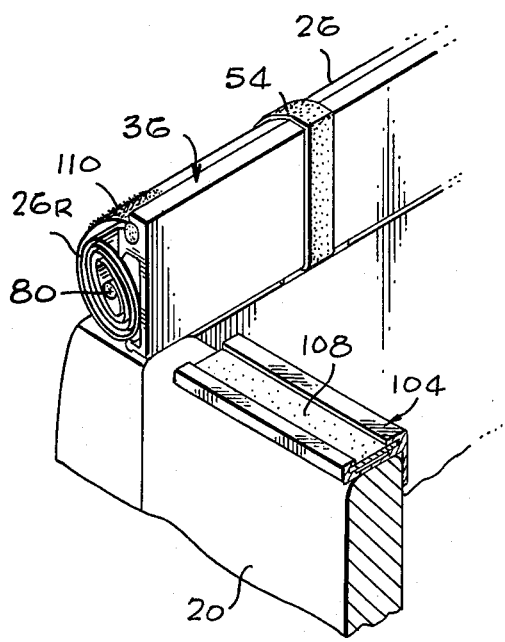
Fig. 9
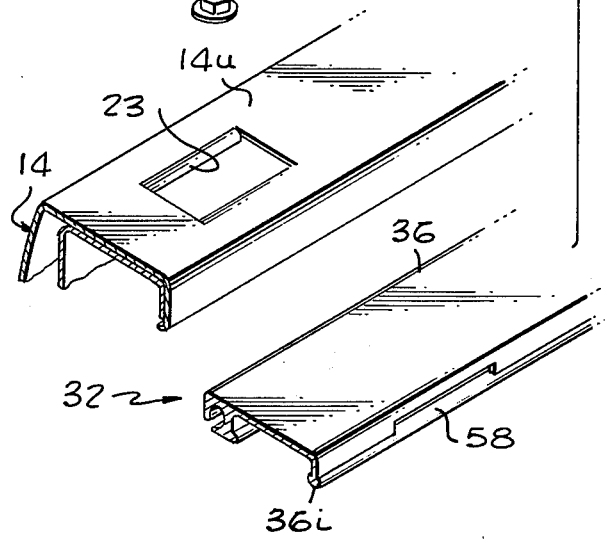
Fig. 5
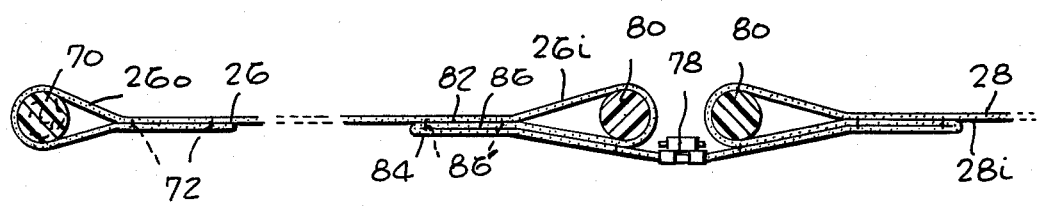
Fig. 6

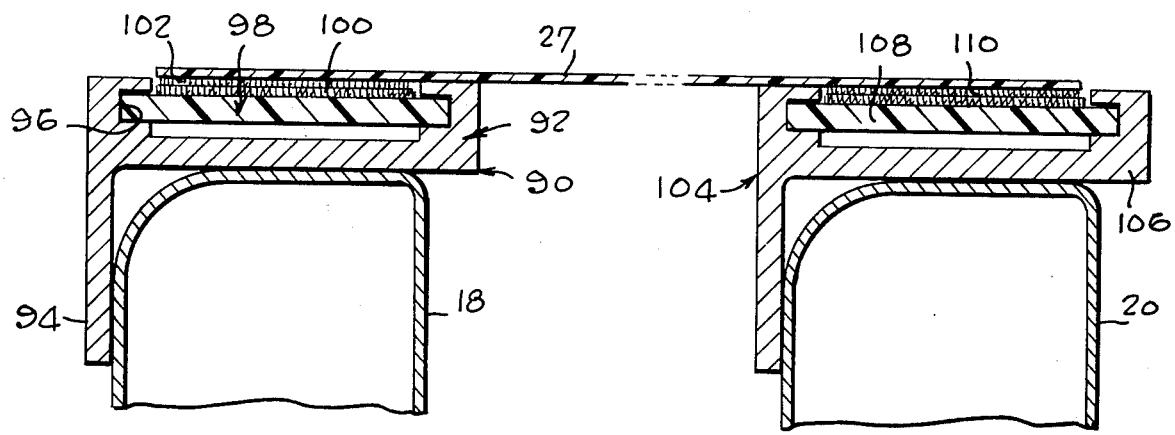
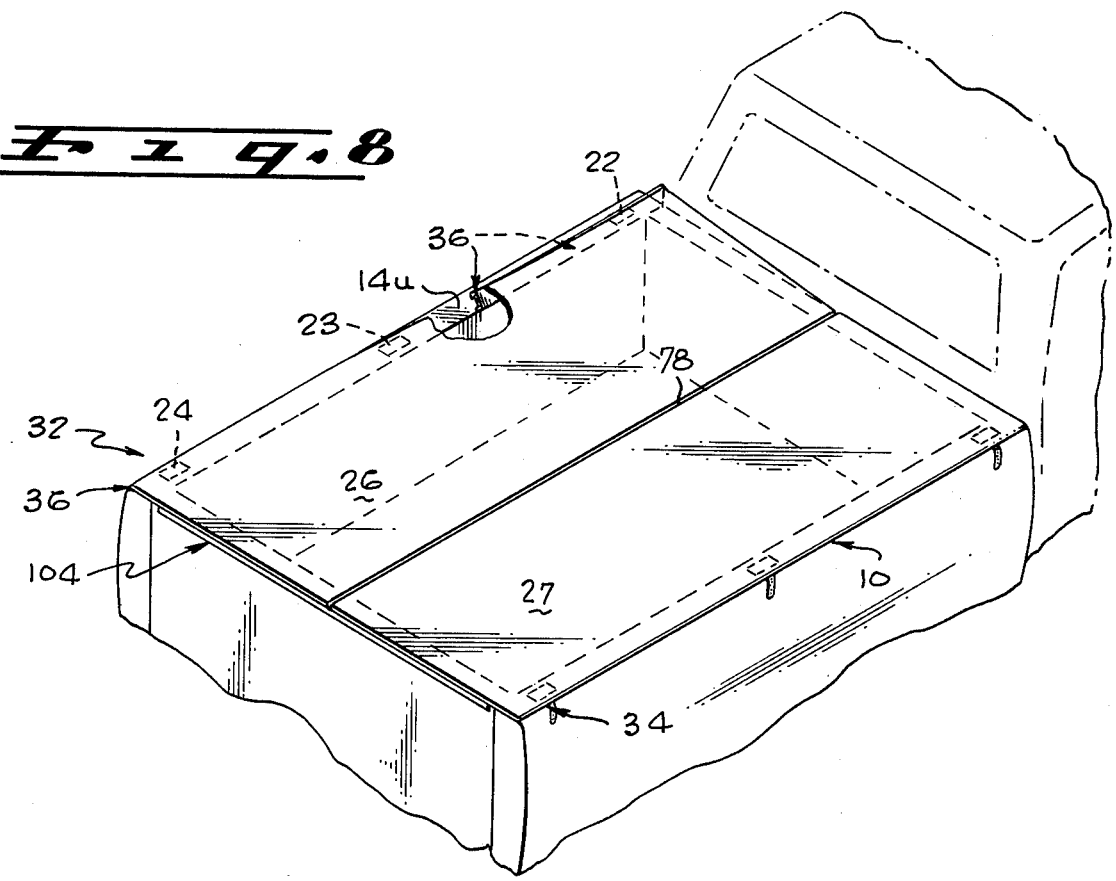

TRUCK COVER ASSEMBLY

BACKGROUND OF THE INVENTION

This invention relates to covering apparatus and, while not limited thereby, to apparatus for covering the open bed of a pickup type truck.

The open bed of a pickup truck can be used to store tools and other goods that might be damaged by rain or weathering, by providing a removable cover. A cover of fabric, flexible plastic, or other sheet material can be utilized, but difficulties are often experienced in providing a secure mount for the edges of the sheets to permit installation on a truck at low cost and to permit rapid opening and closing of a cover. Also, when the cover is closed there should be no significant openings around the edges where water might be admitted, and the cover should be held in a taut state to prevent accumulation of water and debris and to provide an orderly appearance. It is also advantageous if the cover apparatus, when not being used, can be easily and neatly stored in a manner that protects the cover from damage, and with the cover being easily deployed to again cover the truck bed.

SUMMARY OF THE INVENTION

In accordance with one embodiment of the present invention, a cover apparatus is provided which facilitates installation and use, and which is especially useful for covering the enclosed bed of a pickup type truck. The cover assembly includes a pair of cover sections of flexible sheet material which have inner edges that can be zipped together and which have outer edges which are mounted along opposite sides of the truck. The outer edge of each cover section is attached to an elongated lever which extends the length of the open truck bed and which is hinged on a few mounts that are held in the few stake holes commonly provided along either edge of the side walls of a pickup truck bed. Each mount includes a rubber block which can closely fit into a stake hole and which is compressed so that it is held firmly in the stake hole. The cover sections can be zipped together while the levers are in their upward position. The levers are then pivoted in an outward and downward direction until lips on the levers pass under lips on the mounts, the tension of the stretched cover serving to retain the levers in their downward or latched position.

The outer edge of each cover section is wrapped about a mount rod, which may be an ordinary flexible rope, and the mount rod or rope is installed in a recess of the lever to hold the edge of the cover section in a manner that prevents large local stresses that could otherwise cause tearing or wrinkling of the cover. The inner edge portion of each cover section is wrapped about a rollup rod that is utilized in rolling up the cover section for storage.

The novel features that are considered characteristic of this invention are set forth with particularity in the appended claims. The invention will be best understood from the following description when read in connection with the accompanying drawings.

BRIEF DESCRIPTION OF THE DRAWINGS

FIG. 2 is a plan view of the open bed portion of the truck of FIG. 1, shown prior to the installation of the cover apparatus thereon;

FIG. 3 is a view taken along the line 3—3 of FIG. 1, but showing the configuration prior to complete closing of the cover apparatus;

FIG. 4 is a view taken along the line 4—4 of FIG. 3;

FIG. 5 is a perpsective exploded view of the apparatus of FIG. 3;

FIG. 6 is a view taken along the line 6—6 of FIG. 1;

FIG. 7 is a view taken along the line 7—7 of FIG. 1;

FIG. 8 is a perspective view of the apparatus of FIG. 1, shown during the final stage of complete closing of the cover apparatus; and FIG. 9 is a partial perspective view of the apparatus of FIG. 1, showing the cover apparatus in a stored configuration.

DESCRIPTION OF THE PREFERRED EMBODIMENTS

Figure 1:
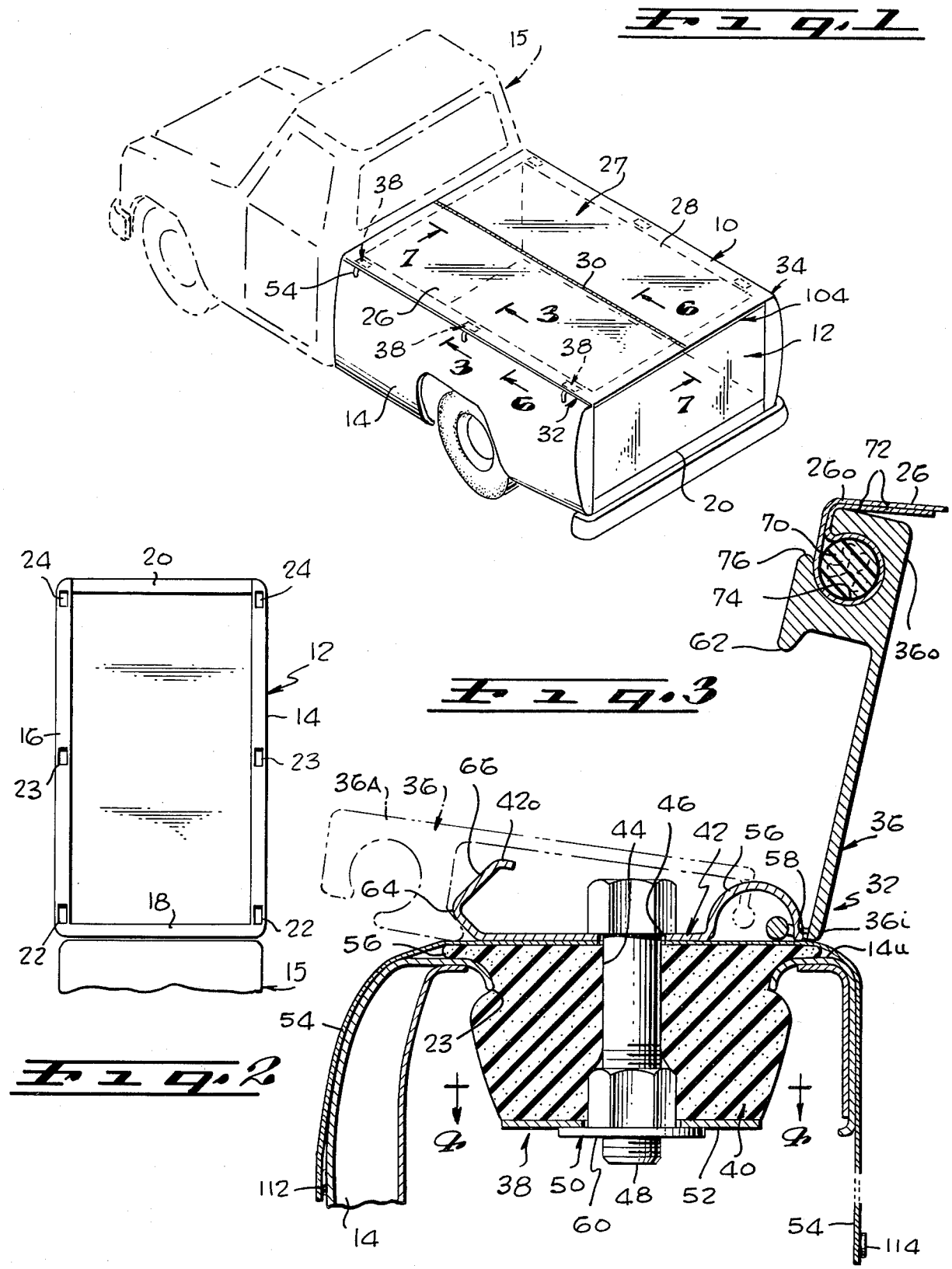
FIG. 1 is a perspective view of a truck with the cover apparatus of the invention installed thereon and in a fully closed configuration.

FIG. 1 illustrates a cover apparatus 10 which is mounted on the open box-like body 12 of a pickup truck 15, to protect goods held in the body. As also shown in FIG. 2, the body 12 includes a pair of upstanding side walls 14, 16, a front end wall 18, and a tailgate 20. Each of the side walls 14, 16 has three pockets or stake holes 22, 23, 24, and the present invention utilizes six mounts that are attached at the stake holes to hold the cover assembly to the truck. The cover assembly includes a cover 27 formed by a pair of cover sections 26, 28 constructed of flexible sheet material such as a fabric or flexible plastic, the material preferably being resilient so it can stretch at least a few percent without tearing. The assembly also includes a zipper 30 for fastening together the inner edges of the cover sections, and a pair of mount assemblies 32, 34 for mounting the outer edges of the cover section on the sides of the truck body.

FIGS. 3–5 illustrate details of one of the mount assemblies 32 which mounts an outer portion 26o of the cover section 26 on the side wall 14 of the truck body. The mount assembly includes lever 36 which is an elongated member extending along most of the length of the truck bed 12, and three identical mounts 38 attached at the locations of the three stake holes 22–24 to hold the lever 36 to the side wall of the truck body. The lever 36 can lie in the unlatched position shown in solid lines in FIG. 3 while the cover sections are being zipped closed, and the lever then can be pivoted outwardly and downwardly to the position shown in phantom lines at 36A to hold the cover sections tautly. A person can partially open the cover 27 as to remove a small object, by partially unzipping the cover, and he can then close the cover by zipping it closed, all without moving the levers 36.

The mount 38 includes plug or block 40 of rubber or other elastomeric material, of a width and length initially equal to the width and length of the stake hole 23 to permit the block to closely fit into the stake hole. A mount member or clip 42, which serves top pivotally support the lever 36, is disposed on top of the rubber block 40 over a storage strap 54 to be described below. The block has a central hole 44 extending along its depth and the clip 42 has a corresponding hole 46, to permit a bolt 48 to be received through the clip and block. A nut 50 threaded on the bottom of the block and against a large washer 52 lying at the lower block surface, serves to hold the clip 42 securely to the block and to compass and expand the block to the configuration shown in FIG. 3 for securely holding the block in place.

The mount 38 is prepared for installation by projecting the bolt 38 downwardly through the clip 42, through a hole in the storage strap 54, through the block 40, and through the washer 52. The nut 50 is threaded onto the bottom of the bolt, and the bolt 48 is then turned while the nut 50 is stationary, until the bolt draws the nut 50 slightly into the rubber block so that friction of the nut on the block prevents the nut from turning when the bolt is later turned. The assembly is then positioned over a stake hole 23 in the truck and the block 40 is pressed down through the stake hole until a lip 56 on the block rests on the upper surface 14u of the turck body side. During such initial installation of the block, the lever 36 is positioned so that a hinge end 56 of the clip passes through one of three solts 58 formed in the lever to mount the lever on the clip. After the block has been pressed into the stake hole, the bolt 48 is tightened to drawn the nut 50 up into the rubber block so that a washer end 60 of the nut presses against the large washer 52 at the bottom of the block. As the bolt is tightened, the block is compressed in depth between the clip 42 and the nut and washer 50, 52, thereby causing the block to expand sidewardly so that its width becomes greater than the width of the stake hole 23, as shown in FIG. 3. The block is then securely held in place, so that it can hold the clip 42, which holds the lever 36, which in turn holds an outer portion of a cover section 26.

The nut 50 is a "Whiz-Lock" type of reinforced nut, and is installed in an upside-down position so that the small end of the nut enters the rubber block. By orienting the nut with the smaller end upwardly so that it can enter the block of rubber, initial entry of the nut is achieved before significant tightening of the bolt has occurred. With the rubber block only slightly deformed so it can enter the stake hole, and with the nut prevented from rotation, a person can complete the installation without the necessity for applying a wrench under the inserted block to prevent the nut from turning. As tightening proceeds and the nut washer portion 60 contacts the large washer 52, pressure begins to be applied over a large portion of the lower block surface, to prevent the nut from simply puncturing the center of the block. Both the Whiz-Lock 50 and washer 52 are standard and easily available items. The use of the upside-down washer 50, with the upper portion entering far into the rubber block, tends to cause a pear-shaped deformation of the block, with the portion of the block immediately below the walls of the stake holes 23 bulging more than the bottom of the block. This type of bulging is more effective in securely holding the block in place than would a bulging configuration with maximum bulging halfway between the bottom and top of the block, inasuch as it is the bulging that occurs immediately below the walls of the stake hole 23 that serves to hold the block in place.

The lever 36 is an extruded member of substantially uniform cross-section, except for the three slots 58 formed in the hinge or inner end 36i of the lever which receive the hinge portion 56 of the clip. The latch or outer end 36o of the lever holds the outer edge of the cover section 26 and forms an inwardly-extending lip 62. The lip 62 is designed to pass downwardly across a corresponding lip 64 formed at a latch or outer end 42o of the clip. The lip 62 on the lever thereafter lies below and inward of the clip lip 64 to prevent unlatching of the lever. The hinge or inner end 36i of the lever is pivotally mounted on the clip in a loose manner to permit a limited degree of inward and outward movement of the lever when the lever is near its latched position of 36A. The tension of the cover section 26 tends to pull the lever inwardly, so that the lip 62 on the lever tends to remain securely under and inward of the clip lip 64 to keep the lever in a latched condition. During downward pivoting of the lever towards the latched position, it must shift outwardly to pass over the lip 64. A person normally presses only downwardly on the lever 26. The surface 66 of the clip immediately above the lip thereof is angled in a downward and outward direction along a substantially straight line, so that it acts as a cam to convert downward force on the lever into outward force that shifts the lever outwardly so it can ride over the lip 64. The tension of the fabric is substantially constant as the lever rides along the surface 66, so that a straight surface 66 (as seen in the sectional view of FIG. 3) allows latching of the lever by the application of a minimum downward force on the lever.

The cover section 26 and lever 36 are designed to substantially eliminate concentrated forces along the outer edge portion 26o of the cover section which could cause tearing. Tearing of a cover is often a problem where a series of grommets are installed along edges of the cover section to hold it in place. In the present invention, a mount rod 70 is provided, and the outer edge portion 26o of the cover section is wrapped about the mount rod. The two layers of the cover section are stitched together along the lines 72. The outer edge of the cover section with the mount rod 70 therein is held in a passageway or undercut recess 74 which is formed in the outer portion of the lever. The recess 74 has a narrow entrance or opening 76 through which the cover extends, the entrance 76 being narrower than the rod 70 with the cover wrapped thereabout to resist loss of the cover from the lever. The rod 70 is formed of a flexible and soft material such as ordinary rope. Although a fiberglass rod can be used for the mount rod 70, a rope is utilized to minimize costs. The rod with the cover wrapped thereabout is installed by merely sliding them into one end of the lever recess 74 and up to the opposite end. Inasmuch as the lever is of uniform cross-section, it applies a substantially uniform holding force to the cover section all along the length of the lever, without localized high stresses that could lead to tearing.

The inner edge portion 26i of the cover section 26 is coupled to the right side 16 of the truck body, by the other cover section 28. FIG. 6 illustrates the inner edge portion 26i, 28i of the cover sections which are held together by a zipper at 78. When the cover is not in use, it can be stored by unzipping the sections and rolling up each cover section starting from the inner edge portion thereof. In order to facilitate rollup, a rollup rod 80 is provided at the inner edge of each cover section. The rollup rod 80 is preferably fairly stiff instead of limp, and a fiberglass rod may be used. In order to install the rod, the inner edge portion of the cover section is wrapped about the rod, the material then being folded again on itself and extending back across the rod to leave a free inner edge for mounting a portion of the zipper 78. Thus, at the inner edge portion of the cover section, the material forms a pair of covering layers 82, 84 and a middle layer 86 sandwiched between them, with the three layers being held together by lines of stitches at 86'. The rollup rod 80 lies between the middle layer 86 and one of the covering layers 82, while another covering layer 84 extends beyond the middle of the rod 80 to hold half of the zipper 78 or any other zipper means such as Velcro (a releasable fastener formed by a multiplicity of miniature resilient hooks) for fastening to the other cover section.

The forward and rearward ends of the cover 27 formed by the cover sections is securely held down to the front body wall 18 and to the top of the tailgate 20 in the manner shown in FIG. 7. A front holder 90 includes a holder member 92 with a locating arm 94 that lies against the front surface of the body wall 18 and an upper portion with a pair of slots 96 that hold a fastening strip 98. The fastening strip 98 has a layer of Velcro 100 which engages a corresponding layer of Velcro 102 on each section of the cover 27. A rear holder 104 is of identical construction, including an elongated holder member 106 of uniform cross-section which extends along most of the length of the tailgate and which holds a strip 108 with Velcro that engages a corresponding Velcro layer 110 on the rear edge of the cover 27. After the cover sections have been zipped together and the lever on each side of the truck body has been latched down, the forward and rearward edges of the cover can be sealed to the truck body by merely pressing down on the cover along the front and rear edges.

FIG. 8 illustrates the cover assembly 10 during the final closing of the cover, when the lever of one mount assembly 34 has been latched down and closed while the lever 36 of the other mount assembly 32 has been only partially latched. In order to latch the lever 36 of the left side of the vehicle, a person presses down at one end of the lever such as near the stake hole 24 to latch that end of the lever, and then presses down the ever portion at the next stake hole 23 and finally at the stake hole 22. When only one end of the lever 36 has been latched down, as is shown in FIG. 8, the lever tends to be twisted, with the latched end lying nearly horizontal while the front end at the stake hole 22 may extend largely vertical due to tension in the cover 27. Several advantages are obtained by allowing the lever to twist. One advantage is that the lever does not have to be constructed with a large cross-section to prevent twisting. Another advantage is that less downward force is required to latch the lever closed, since a person does not have to overcome the tension force which is applied along the entire length of the lever. The amount of tension in the cover and therefore the amount of twisting of the lever depends upon the tautness of the cover, the tautness generally being greatest in cold weather when the cover material contracts and may be of minimum resiliency. The lever 36 is constructed of a stiff material, to prevent large deflections along the lever portion lying between the stake holes where the lever is held down, but with the material being capable of withstanding considerable twisting without deformation. Type 6010 T6 aluminum has been found to be satisfactory for use as the lever. This material has a memory, so that after a lever of this material is exposed to considerable twisting during the closing, the lever will tend to return to its original straight configuration after closing. As a result unsightly gaps are not created along the latched-down lever.

When the truck bed must be left fully opened, the cover sections 26, 28 can be stored neatly on the truck in the manner shown in FIG. 9, wherein the cover sections are also protected against damage. Storage is easily accomplished by rolling up each cover section such as 26 beginning with the inner edge portion at the rollup rod 80, until the cover section is fully coiled. The rolled up cover section, as shown at 26R, is stored on the outside of the lever 36, with the lever in a vertical position, and the rolled up cover section is held in place by three storage straps 54 (one at each mount 38) which have snap parts 112, 114 (FIG. 3) that can be snapped together. The straps 54 and lever 36 hold the rolled up cover section at a height which is below the top of the upstanding lever; if necessary, the cover section can be pressed down to lie below the top of the lever. The lever 26 therefore protects the rolled up cover section from damage from heavy objects. Objects are often moved into and out of a pickup truck by sliding them along the top of the side walls. If this is donw with the cover stowed in the manner shown in FIG. 9, the object will slide along the lever 36 so that the rolled up cover 26A will be protected against damage.

Thus, the invention provides apparatus for covering the open bed of a truck or the like, which is of simple design, which facilitates initial installation on the truck, which facilitates opening and closing of the cover as well as its storage, and which enables safe storage of the cover on the truck when the cover is not being used. Initial mounting of the assembly is facilitated by the use of elastomeric blocks which can be readily installed in stake holes that are often provided in trucks and which can be securely held in place by merely turning a bolt from above. Closing of the cover assembly is facilitated by the use of a cover-holding lever which can be pivoted down to hold the cover tight, and which utilizes tension in the taut cover to latch the lever in a downward position. The cover is held in a manner that eliminates large localized stresses, by utilizing a lever that extends along most of the length of the truck body and by utilizing a mount rod about which the outer edge of the cover is wrapped and with the mount rod lying in a recess of the lever. Rollup of the cover section is facilitated by utilizing a stiff rod at the inner edge of the cover section about which the inner cover portion is wrapped. Safe storage of the cover is facilitated by utilizing a lever extending along most of the length of the truck bed which can lie above or at about the same level as the rolled up cover to protect it.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. Apparatus for covering an open body of a truck that has body sides, comprising:
    a pair of cover sections, each formed of flexible sheet material and having inner and outer edge portions, and each having zipper means along its inner edge portion for fastening to the other cover section;
    a pair of mount means for mounting the outer edge portion of a corresponding one of said cover sections on a truck body side, with the inner edge portions of said cover sections adjacent to each other; and
    a pair of rollup rods;
    the inner edge portion of each cover section being folded twice on itself to form a pair of covering layers and a middle layer sandwiched between the covering layers, and to form a loop where said middle layer and a predetermined one of said covering layers meet, one of said rollup rods lying between said middle layer and said predetermined one of said covering layers at the loop therebetween, said three layers being fastened together along a fastening line adjacent to said rollup rod, and one of said cover layers extending inwardly beyond the middle of said rod and holding said zipper means.

2. Apparatus for covering an open body of a truck that has opposite truck body sides comprising:

a cover formed of flexible sheet material and having first and second opposite outer edge portions; and first and second mount means for mounting the respective outer edge portions of said cover on the opposite truck body sides;

said first mount means including at least one mount fixable on the truck body side and a lever coupled to said mount, said lever having an outer lever portion attached to said first outer edge portion of said cover and said lever having a hinge end pivotally coupled to said mount to permit pivoting of said lever with respect to said mount between a release position and a latched position, said outer lever portion lying further from said second outer edge portion of said cover when said lever is in said latched position than when said lever is in said release position, so that when the lever is pivoted from said release position to said latched position the cover is pulled taut;

said outer lever portion includes a lever lip extending towards the hinge end of the lever;

said mount includes a mount lip lying in the path of said lever lip when said lever pivots; and said lever is loosely pivotally coupled to said mount to permit outward shifting of said lever as its lip passes across said mount lip, whereby said lever can be deflected outwardly so its lip passes downwardly below the mount lip and said lever then tends to be pulled inwardly by tautness of the cover section so that its lip cannot readily pass upwardly across the mount lip.

3. The apparatus described in claim 2 wherein:

said mount includes a fixed member with a downwardly-outwardly inclined camming surface lying immediately above said mount lip and engaging said lever lip, whereby downward pressure of said lever causes it to shift outwardly along said mount until said lever lip passes below said mount lip.

4. Apparatus for covering an open body of a truck that has opposite truck body sides comprising:

a cover formed of flexible sheet material and having first and second opposite outer edge portions and an inner portion between said outer edge portions; and first and second mount means for mounting the respective outer edge portion of said cover on the opposite truck body sides;

said first mount means including a lever having innner and outer lever portions, means for pivotally supporting the inner lever portion, and a plurality of latches spaced along the length of said lever, each engagable with only one location along said lever;

said outer lever portion being attached to said first outer edge portion of said cover and said lever being pivotable between a release position and a latched position, said outer lever portion of said cover lying further from said second outer edge portion when said lever is in said latched position than when said lever is in said release position, so that when the lever is pivoted from said release position to said latched position the cover is pulled taut, and said latches being constructed to engage portions of said lever when said lever is pivoted to said latched position;

said lever extending along a majority of the length of a corresponding truck body side wall, and being constructed so it can twist 90° along its length without permanently deforming, whereby different locations along said lever can be separately pressed into engagement with a latch to facilitate moving the entire lever to its latched position.

* * * * *